United States Patent
Zhu et al.

(10) Patent No.: US 10,129,069 B2
(45) Date of Patent: Nov. 13, 2018

(54) DATA TRANSMISSION METHOD AND APPARATUS

(71) Applicant: Huawei Technologies Co., Ltd., Shenzhen (CN)

(72) Inventors: Jun Zhu, Shanghai (CN); Jiayin Zhang, Shanghai (CN); Yalin Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 108 days.

(21) Appl. No.: 15/234,891

(22) Filed: Aug. 11, 2016

(65) Prior Publication Data
US 2016/0352556 A1  Dec. 1, 2016

Related U.S. Application Data

(63) Continuation of application No. PCT/CN2014/072094, filed on Feb. 14, 2014.

(51) Int. Cl.
*H04L 27/26* (2006.01)
*H04B 7/04* (2017.01)
*H04W 52/50* (2009.01)
*H04B 7/0426* (2017.01)
(Continued)

(52) U.S. Cl.
CPC ....... *H04L 27/2656* (2013.01); *H04B 7/0426* (2013.01); *H04L 27/2602* (2013.01); *H04L 27/2614* (2013.01); *H04W 52/50* (2013.01); *H04L 5/0053* (2013.01); *H04W 84/12* (2013.01)

(58) Field of Classification Search
CPC ... H04W 52/54; H04W 52/545; H04W 52/50; H04W 84/12; H04B 7/0426; H04L 27/2602; H04L 27/2614; H04L 27/2656; H04L 5/0053
See application file for complete search history.

(56) References Cited

U.S. PATENT DOCUMENTS

| | | | |
|---|---|---|---|
| 7,483,367 B2 | 1/2009 | Chayat et al. | |
| 7,577,210 B2 | 8/2009 | Lee | |
| 8,498,245 B2 | 7/2013 | Wu et al. | |

(Continued)

FOREIGN PATENT DOCUMENTS

| CN | 1734995 A | 2/2006 |
|---|---|---|
| CN | 102244607 A | 11/2011 |

(Continued)

OTHER PUBLICATIONS

LAN/MAN Standards Committee of the IEEE Computer Society, "Part 11: Wireless LAN Medium Access control (MAC) and Physical Layer (PHY) Specifications," Aug. 2016, pp. i-3648, New York.
(Continued)

*Primary Examiner* — Ahmed Elallam
(74) *Attorney, Agent, or Firm* — Slater Matsil, LLP (57) ABSTRACT

In an embodiment, a method includes performing, by a transmit end, transmit power enhancement processing on a target field of a preamble in a wireless local area network (WLAN) system, where the target field includes one or more fields, other than a non-legacy signal field, in a non-legacy field of the preamble in the WLAN system. The method also includes sending, by the transmit end, to a receive end the preamble on which transmit power enhancement processing has been performed.

16 Claims, 4 Drawing Sheets

A transmit end performs transmit power enhancement processing on a target field of a preamble in a wireless local area network WLAN system, where the target field may be one or more fields, except a non-legacy signal field, in a non-legacy field of the preamble in the WLAN system ⸺ 101

The transmit end sends a receive end the preamble on which transmit power enhancement processing has been performed ⸺ 102

(51) Int. Cl.
*H04L 5/00* (2006.01)
*H04W 84/12* (2009.01)

(56) References Cited

U.S. PATENT DOCUMENTS

| | | | |
|---|---|---|---|
| 8,619,655 B2 | 12/2013 | Zheng et al. | |
| 8,717,865 B2* | 5/2014 | Yang | H04L 5/0023 |
| | | | 370/203 |
| 8,917,784 B2* | 12/2014 | Yang | H04L 27/2613 |
| | | | 370/334 |
| 8,934,572 B2* | 1/2015 | Zheng | H04L 5/0048 |
| | | | 375/296 |
| 9,019,991 B1* | 4/2015 | Zhang | H04L 29/02 |
| | | | 370/330 |
| 9,054,929 B2* | 6/2015 | Yang | H04L 27/2615 |
| 9,497,000 B2* | 11/2016 | Choi | H04L 27/2613 |
| 9,844,010 B2* | 12/2017 | Zhang | H04W 52/50 |
| 9,882,754 B2* | 1/2018 | Zhu | H04L 27/2602 |
| 2006/0034384 A1 | 2/2006 | Lee | |
| 2006/0252443 A1* | 11/2006 | Sammour | H04W 4/08 |
| | | | 455/518 |
| 2007/0104089 A1 | 5/2007 | Mujtaba | |
| 2007/0270173 A1* | 11/2007 | Niu | H04B 7/0413 |
| | | | 455/522 |
| 2011/0051705 A1 | 3/2011 | Jones, IV et al. | |
| 2011/0103494 A1 | 5/2011 | Ahmadi | |
| 2011/0305194 A1 | 12/2011 | Zheng et al. | |
| 2013/0315218 A1* | 11/2013 | Cheong | H04W 16/26 |
| | | | 370/338 |
| 2014/0211775 A1* | 7/2014 | Sampath | H04W 28/06 |
| | | | 370/338 |
| 2015/0023272 A1* | 1/2015 | Choi | H04L 27/2613 |
| | | | 370/329 |

FOREIGN PATENT DOCUMENTS

| | | |
|---|---|---|
| CN | 102377468 A | 3/2012 |
| CN | 102714643 A | 10/2012 |
| EP | 2395678 A1 | 12/2011 |

OTHER PUBLICATIONS

Sameer Vermani, et al., "Preamble Format for 1 MHz," PowerPoint, Qualcomm, Jan. 16, 2012, 23 pages.

* cited by examiner

DATA TRANSMISSION METHOD AND APPARATUS

CROSS-REFERENCE TO RELATED APPLICATIONS

This application is a continuation of International Patent Application No. PCT/CN2014/072094, filed on Feb. 14, 2014, which is hereby incorporated by reference in its entirety.

TECHNICAL FIELD

Embodiments relate to the field of communications technologies, and more specifically, to a data transmission method and apparatus.

BACKGROUND

As a data transmission system, a wireless local area network (WLAN) replaces, by using a radio frequency (RF) technology, a local area network formed by using traditional twisted pair copper cables, so that in the wireless local area network, a user can achieve an objective of information transmission by using a simple access architecture. Wireless fidelity (Wi-Fi) is a communications technology brand of a wireless network, is held by the Wi-Fi Alliance, and aims to enhance interconnectivity between wireless network products that are based on the IEEE 802.11 standards. A wireless local area network that uses the IEEE 802.11 series protocols may be referred to as a Wi-Fi network.

As intelligent terminals are widely applied, people impose increasing requirements on network data traffic, a Wi-Fi system in a wireless local area network evolves from 802.11a/b to 802.11g, 802.11n, then 802.11ac, and the like, and accordingly, a data rate substantially increases. Therefore, how to improve an overall throughput rate of the system and enhance data transmission performance and user experience becomes an urgent problem to be resolved.

SUMMARY

Embodiments provide a data transmission method and apparatus, which can improve an overall throughput rate of a system, so that user experience is enhanced.

According to a first aspect, a data transmission method is provided. The method includes performing, by a transmit end, transmit power enhancement processing on a target field of a preamble in a wireless local area network (WLAN) system, where the target field may be one or more fields, except a non-legacy signal field, in a non-legacy field of the preamble in the WLAN system. The method also includes sending, by the transmit end, a receive end the preamble on which transmit power enhancement processing has been performed.

With reference to the first aspect, in a first implementation manner of the first aspect, the performing, by a transmit end, transmit power enhancement processing on a target field of a preamble in a wireless local area network (WLAN) system includes determining a power enhancement amount of the target field according to a peak-to-average power ratio (PAPR) corresponding to the target field and a transmit power amplification limit of the transmit end; and generating a baseband signal of the target field according to the power enhancement amount of the target field.

With reference to the first aspect and the foregoing implementation manner of the first aspect, in a second implementation manner of the first aspect, the performing, by a transmit end, transmit power enhancement processing on a target field of a preamble in a wireless local area network (WLAN) system further includes adding power enhancement information to a non-legacy signal field of the preamble. The power enhancement information is used to indicate whether power enhancement processing has been performed on the target field, and if power enhancement processing has been performed on the target field, the power enhancement information is further used to indicate the power enhancement amount of the target field.

With reference to the first aspect and the foregoing implementation manners of the first aspect, in a third implementation manner of the first aspect, the PAPR corresponding to the target field is less than a threshold, and the threshold is less than the transmit power amplification limit of the transmit end.

With reference to the first aspect and the foregoing implementation manners of the first aspect, in a fourth implementation manner of the first aspect, the target field includes a long training field (LTF).

According to a second aspect, a data transmission method is provided, where the method includes acquiring, by a receive end, power enhancement information in a non-legacy signal field of a preamble in a wireless local area network (WLAN) system. The power enhancement information is used to indicate that a transmit end has performed transmit power enhancement processing on a target field of the preamble, and the target field may be one or more fields, except a non-legacy signal field, in a non-legacy field of the preamble in the WLAN system. The method also includes receiving, by the receive end, the non-legacy field of the preamble according to the power enhancement information.

With reference to the second aspect, in a first implementation manner of the second aspect, the power enhancement information is used to indicate a power enhancement amount of the target field, and the power enhancement amount is determined by the transmit end according to a peak-to-average power ratio (PAPR) corresponding to the target field and a transmit power amplification limit of the transmit end.

With reference to the second aspect and the foregoing implementation manner of the second aspect, in a second implementation manner of the second aspect, when the target field is a long training field (LTF), the receiving, by the receive end, the non-legacy field of the preamble according to the power enhancement information includes performing a multi-input multi-output (MIMO) channel estimation according to the power enhancement amount of the target field that is indicated by the power enhancement information; and receiving subsequent data and a subsequent field according to a result of the MIMO channel estimation.

According to a third aspect, a data transmission apparatus is provided, where the apparatus includes a power enhancement processing unit, configured to perform transmit power enhancement processing on a target field of a preamble in a wireless local area network (WLAN) system. The target field may be one or more fields, except a non-legacy signal field, in a non-legacy field of the preamble in the WLAN system. The apparatus also includes a sending unit, configured to send a receive end the preamble on which transmit power enhancement processing has been performed.

With reference to the third aspect, in a first implementation manner of the third aspect, the power enhancement processing unit is configured to determine a power enhancement amount of the target field according to a peak-to-average power ratio (PAPR) corresponding to the target field and a transmit power amplification limit of the apparatus;

and generate a baseband signal of the target field according to the power enhancement amount of the target field.

With reference to the third aspect and the foregoing implementation manner of the third aspect, in a second implementation manner of the third aspect, the power enhancement processing unit is further configured to add power enhancement information to a non-legacy signal field of the preamble. The power enhancement information is used to indicate whether power enhancement processing has been performed on the target field, and if power enhancement processing has been performed on the target field, the power enhancement information is further used to indicate the power enhancement amount of the target field.

With reference to the third aspect and the foregoing implementation manners of the third aspect, in a third implementation manner of the third aspect, the PAPR corresponding to the target field is less than a threshold, and the threshold is less than the transmit power amplification limit of the apparatus.

With reference to the third aspect and the foregoing implementation manners of the third aspect, in a fourth implementation manner of the third aspect, the target field includes a long training field (LTF).

According to a fourth aspect, a data transmission apparatus is provided, where the apparatus includes an acquiring unit, configured to acquire power enhancement information in a non-legacy signal field of a preamble in a wireless local area network (WLAN) system. The power enhancement information is used to indicate that a transmit end has performed transmit power enhancement processing on a target field of the preamble, and the target field may be one or more fields, except a non-legacy signal field, in a non-legacy field of the preamble in the WLAN system. The apparatus also includes a receiving unit, configured to receive the non-legacy field of the preamble according to the power enhancement information.

With reference to the fourth aspect, in a first implementation manner of the fourth aspect, the power enhancement information is used to indicate a power enhancement amount of the target field, and the power enhancement amount is determined by the transmit end according to a peak-to-average power ratio (PAPR) corresponding to the target field and a transmit power amplification limit of the transmit end.

With reference to the fourth aspect and the foregoing implementation manner of the fourth aspect, in a second implementation manner of the fourth aspect, when the target field is a long training field (LTF), the apparatus further includes a channel estimation unit, and the receiving unit is configured to perform, by using the channel estimation unit, a multi-input multi-output (MIMO) channel estimation according to the power enhancement amount of the target field that is indicated by the power enhancement information; and receive subsequent data and a subsequent field according to a result of the MIMO channel estimation.

In the embodiments, transmit power enhancement processing is performed on a non-legacy field of a preamble in a wireless local area network WLAN system, which can improve an overall throughput rate of the system, so that data transmission performance and user experience can be enhanced.

BRIEF DESCRIPTION OF THE DRAWINGS

To describe the technical solutions in the embodiments more clearly, the following briefly introduces the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments with reference to the accompanying drawings in the embodiments. Apparently, the described embodiments are some but not all of the embodiments. All other embodiments obtained by a person of ordinary skill in the art based on the embodiments without creative efforts shall fall within the protection scope of the present disclosure.

In the technical solutions of the present disclosure, a transmit end may be a subscriber station (STA) in a WLAN, and the subscriber station may also be referred to as a system, a subscriber unit, an access terminal, a mobile station, a mobile terminal, a remote station, a remote terminal, a mobile device, a user terminal, a terminal, a wireless communications device, a user agent, a user apparatus, or UE (User Equipment). The STA may be a cellular phone, a cordless phone, a SIP (Session Initiation Protocol) phone, a WLL (Wireless Local Loop) station, a PDA (Personal Digital Assistant), a handheld device having a wireless local area network (such as Wi-Fi) communication function, a computing device, or another processing device connected to a wireless modem.

In addition, alternatively, a transmit end may be an access point (AP) in a WLAN, and the access point may be configured to communicate with an access terminal by using the wireless local area network, and transmit data of the access terminal to a network side, or transmit data from the network side to the access terminal.

A receive end may be a communication peer end corresponding to the transmit end.

For ease of understanding and description, as an example instead of a limitation, the following describes an execution process and operation, in a Wi-Fi system, of a data transmission method and apparatus.

Figure 1:
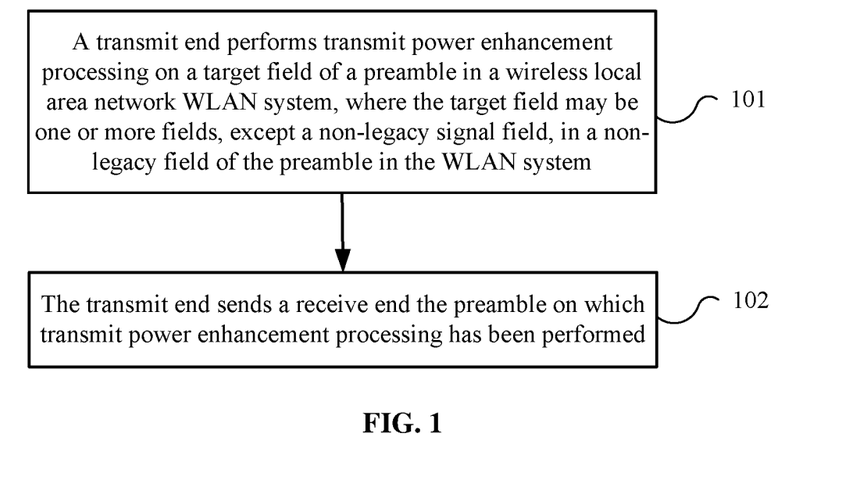
FIG. 1 is a flowchart of a data transmission method according to an embodiment.

FIG. 1 is a flowchart of a data transmission method according to an embodiment.

101. A transmit end performs transmit power enhancement processing on a target field of a preamble in a wireless local area network (WLAN) system, where the target field may be one or more fields, except a non-legacy signal field, in a non-legacy field of the preamble in the WLAN system.

102. The transmit end sends a receive end the preamble on which transmit power enhancement processing has been performed.

In this embodiment, transmit power enhancement processing is performed on a non-legacy field of a preamble in a wireless local area network WLAN system, which can improve an overall throughput rate of the system, so that data transmission performance and user experience can be enhanced.

A frame structure of a Wi-Fi system mainly includes a preamble, a service field, a data field, a trailer field, and the like. The preamble mainly implements functions such as frame detection, automatic gain control, a frequency offset estimation, time synchronization, and a channel estimation. The preamble may be divided into a legacy field part and a non-legacy field part.

Generally, the legacy field part of the preamble includes three fields, that is, a legacy short training field (L-STF), a legacy long training field (L-LTF), and a legacy signal (L-SIG) field. The L-STF is used for frame start detection, automatic gain control (AGC) setting, an initial frequency offset estimation, and initial time synchronization. The L-LTF is used for a more precise frequency offset estimation and more precise time synchronization, and is also used to receive and balance the L-SIG field and generate a channel estimation result. The L-SIG field is mainly used to carry data rate information and data length information, so that the receive end can determine, according to the data rate information and the data length information, a length of data that is carried in a same frame as the preamble, so that a proper period of idle time can be determined.

The non-legacy field part may be a field, in the preamble, except the foregoing legacy field part. Fields specifically included in the non-legacy field part depend on a version of an IEEE 802.11 standard. For example, in the IEEE 802.11n standard, the non-legacy field part includes a high throughput signal (HT-SIG) field, a high throughput short training field (HT-STF), a high throughput long training field (HT-LTF), and the like.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

Optionally, the transmit end first needs to determine a target field on which transmit power enhancement is to be performed. Specifically, one or more target fields may be determined from the foregoing non-legacy field part according to a system status and a service requirement, where a peak-to-average power ratio (PAPR) corresponding to the target field is less than a transmit power amplification limit of the transmit end. In addition, in this embodiment, the transmit end may determine the transmit power amplification limit.

Optionally, the transmit power amplification limit is determined according to a maximum output power of a power amplifier used by the transmit end.

Specifically, a power amplifier generally has a linear range. Within the linear range, a ratio of an output power to an input power linearly increases. However, when the input power exceeds a specific threshold, an effect of power amplification obviously weakens, and if the input power continues to increase, the output power remains unchanged. That is, the power amplifier has a maximum output power (recorded as $P_{max}$), or there is an inflection point on a curve of the ratio of the output power to the input power, and an output power and an input power of a part after the inflection point are basically the same. Therefore, an effect of power amplification without distortion cannot be achieved. In this embodiment, as an example instead of a limitation, the foregoing transmit power amplification limit may be determined according to the foregoing maximum output power.

For example, before a selected target field signal enters the power amplifier, assuming that an average power of the target field signal is $P_1$, and a peak power of the target field signal is $P_2$, a PAPR (recorded as $\beta$) of the target field signal may be indicated by $\beta = P_2/P_1$, that is, $$P_2 = P_1 \cdot \beta \quad (1)$$

Assuming that an amplification multiple of the power amplifier is x, an average transmit power of the signal that is obtained after amplification is performed by the power amplifier is $P_1 \cdot x$. In addition, in a communications system, an average power of a transmit signal should meet a regulation of the standard, that is, the average power of the transmit signal should be less than or equal to a maximum average transmit power $P_{standard}$ specified in the standard. Generally, the signal is transmitted at full power, that is, $$P_1 \cdot x = P_{standard} \quad (2)$$

According to the foregoing limitation of the power amplifier, the following needs to be met:

$$P_2 \cdot x < P_{max} \quad (3)$$

Therefore, it may be learned from formulas (1), (2), and (3) that $\beta < P_{max}/P_{standard}$. Therefore, the transmit end may determine the foregoing transmit power amplification limit according to the maximum output power of the power amplifier used by the transmit end and the maximum average transmit power of the signal. For example, a value of $P_{max}/P_{standard}$ may be used as the foregoing transmit power amplification limit. In addition, the transmit power amplification limit generally may be, for example, 8 dB.

It should be understood that the foregoing method for determining the transmit power amplification limit and the foregoing value of the transmit power amplification limit are merely for exemplary description, and the present disclosure is not limited thereto. For example, alternatively, the transmit power amplification limit may be less than the value of $P_{max}/P_{standard}$ or greater than the value of $P_{max}/P_{standard}$, which is not specially limited in the present disclosure.

Optionally, in an embodiment, that a transmit end performs transmit power enhancement processing on a target field of a preamble in a wireless local area network WLAN system includes determining a power enhancement amount of the target field according to a peak-to-average power ratio (PAPR) corresponding to the target field and the transmit power amplification limit of the transmit end, and generating a baseband signal of the target field according to the power enhancement amount of the target field.

It should be understood that the PAPR corresponding to the target field may be determined according to a system bandwidth. For example, Table 1 shows PAPR values of some fields of an IEEE 802.11n preamble in a case of a system bandwidth of 20 MHz.

TABLE 1

|  | L-STF | L-LTF | L-SIG | HT-SIG | HT-STF | HT-LTF |
|---|---|---|---|---|---|---|
| 20 MHz | 2.2394 | 3.2245 | 7.7825[+] | 8.0716[+] | 2.2394 | 3.2245 |

When the system bandwidth is 20 MHz, and the target field is an HT-LTF, it may be determined that a PAPR value corresponding to the target field is 3.2245. It should be understood that the foregoing correspondence between the system bandwidth and a PAPR value of each field may be stored at the transmit end in advance, and the transmit end may directly acquire, read, or invoke, according to the system bandwidth, a PAPR value corresponding to a target field.

The transmit end may determine, according to the power amplifier used by the transmit end, a limit to which the transmit end can perform power amplification. For example, in the foregoing IEEE 802.11n scenario in which the system bandwidth is 20 MHz, the transmit power amplification limit of the power amplifier is 8 dB, that is, if a PAPR of a preamble exceeds 8 dB, a transmit signal is obviously distorted, which causes a decrease in system performance. The power enhancement amount of the target field is determined according to the peak-to-average power ratio (PAPR) corresponding to the target field and the transmit power amplification limit of the transmit end. An amount by which power enhancement can be performed on the target field is 8-3.2245 dB, and the transmit end may determine any power enhancement amount less than the amount by which power enhancement can be performed. For example, the transmit end may determine that the power enhancement amount is 4 dB. It should be understood that the transmit end may determine a proper power enhancement amount according to a system status, a service requirement, and the like. Specifically, when system load is relatively low, a relatively small power enhancement amount may be determined; when system load is relatively high, a relatively large power enhancement amount may be determined, which is not limited in the present disclosure.

It should further be understood that the power enhancement amount may be an actual power enhancement value, or may be a power enhancement factor. For example, if the power enhancement factor is $\alpha$, the actual power enhancement value may be $20 \cdot \log_{10}(\alpha)$ dB.

After the power enhancement amount of the target field is determined, the baseband waveform of the target field may be generated according to the power enhancement amount by using the following formula:

$$r_{NL-LTF}^{n,i_{TX}}(t) = \frac{\alpha}{\sqrt{N_{STS} \cdot N_{NL-LTF}^{Tone}}} w_{T_{NL-LTFs}}(t) \cdot \sum_{k=-N_{SR}}^{N_{SR}} \sum_{i_{STS}=1}^{N_{STS}} [Q_k]_{i_{TX},i_{STS}} [P_{NLLTF}]_{i_{STS},n}$$

$$\gamma_k NLLTF_k \exp(j2\pi k \Delta_F (t - T_{GI} - T_{CS}^{i_{STS}})),$$

where

NLLTF indicates a non-legacy LTF subcarrier value, $T_{CS}^{i_{STS}}$ indicates a circular delay value, $T_{GI}$ indicates a guard interval value, $P_{NLLTF}$ indicates a flow mapping matrix, $Q_k$ indicates a space mapping matrix, $\gamma_k$ indicates a frequency domain rotation value, $N_{STS}$ indicates a quantity of space time flows, $N_{NL-LTF}^{Tone}$ indicates a quantity of subcarriers in use, $w_{T_{NL-LTFs}}(t)$ indicates a time domain window function, and $\alpha$ is a transmit power enhancement factor. If transmit power enhancement is not performed, $\alpha=1$; if transmit power enhancement is performed, a transmit power enhancement value is $20 \cdot \log_{10}(\alpha)$ dB.

Optionally, in an embodiment, that a transmit end performs transmit power enhancement processing on a target field of a preamble in a wireless local area network (WLAN) system further includes adding power enhancement information to a non-legacy signal field of the preamble. The power enhancement information is used to indicate whether power enhancement processing has been performed on the target field, and if power enhancement processing has been performed on the target field, the power enhancement information is used to indicate the power enhancement amount of the target field.

The transmit end may add the power enhancement information to the non-legacy signal field such as an HT-SIG field, to indicate transmit power enhancement of the target field. The power enhancement information may indicate whether a transmit power of the target field has been enhanced. For example, "000" may be used to indicate that transmit power enhancement has not been performed on the target field, and "001" may be used to indicate that transmit power enhancement has been performed on the target field. The power enhancement information may further indicate the power enhancement amount of the target field. For example, "001" may indicate that the transmit power is enhanced by 1 dB, "010" may indicate that the transmit power is enhanced by 2 dB, "011" may indicate that the transmit power is enhanced by 3 dB, and the rest can be deduced by analogy. It should be understood that the power enhancement information may occupy more or less bits to describe related information of transmit power enhancement, which is not limited in the present disclosure.

Optionally, in an embodiment, the PAPR corresponding to the target field is less than a threshold, and the threshold is less than the transmit power amplification limit of the transmit end.

In an embodiment, the target field may be a field with a relatively low PAPR. For a field with a relatively low PAPR, there is much room for power enhancement, that is, there is also much room for enhancing system performance. Specifically, the system or the transmit end may preset the threshold, and the threshold is less than the transmit power amplification limit of the transmit end. It may be determined that a field in the non-legacy field whose PAPR is less than the threshold is a target field on which power enhancement is to be performed. For example, the example in the foregoing embodiment continues to be described. If the transmit power amplification limit of the transmit end is 8 dB, and the system or the transmit end presets the threshold to 5, it may be determined that a non-legacy field whose PAPR value is less than 5 is the target field. In the foregoing Table 1, fields that meet the condition are an HT-STF and an HT-LTF.

Optionally, the target field includes a long training field (LTF). In an embodiment, when the target field is a long training field (LTF) in a non-legacy field, because the LTF generally has a multi-input multi-output (MIMO) channel estimation function, improving a transmit power of the LTF can enhance accuracy of a MIMO channel estimation and reduce a frame error rate of the system, so that an objective of enhancing system performance and user experience can be achieved. It should be understood that LTFs in a non-legacy field may be different according to different versions of the standard. A specific example is that in IEEE 802.11n, the target field may be a high throughput long training field HT-LTF.

In this embodiment, transmit power enhancement processing is performed on a non-legacy field of a preamble in a wireless local area network WLAN system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that a peer end can acquire the power enhancement information, and perform a channel estimation according to the power enhancement information; therefore, accuracy of receiving a subsequent field is enhanced.

Figure 2:
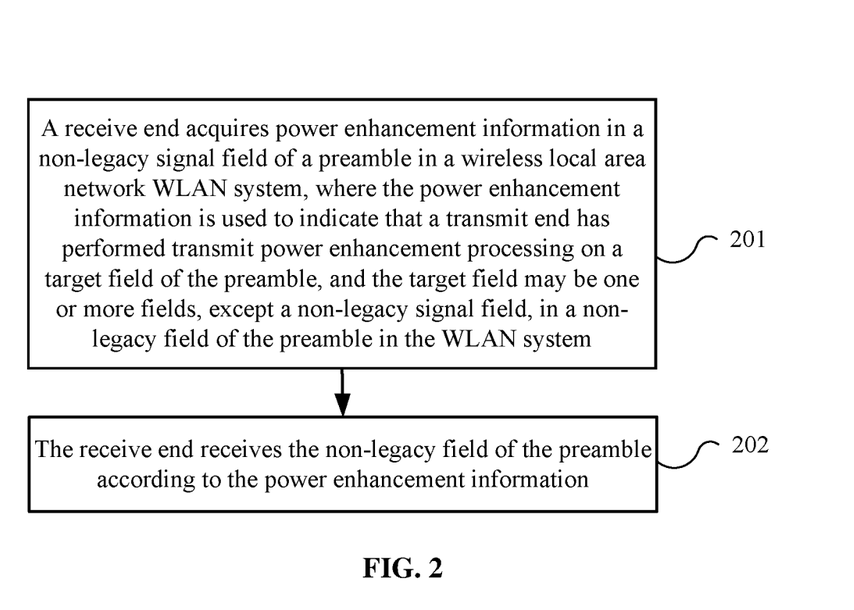
FIG. 2 is a flowchart of a data transmission method according to an embodiment.

FIG. 2 is a flowchart of a data transmission method according to an embodiment.

201. A receive end acquires power enhancement information in a non-legacy signal field of a preamble in a wireless local area network (WLAN) system, where the power enhancement information is used to indicate that a transmit end has performed transmit power enhancement processing on a target field of the preamble, and the target field may be one or more fields, except a non-legacy signal field, in a non-legacy field of the preamble in the WLAN system.

202. The receive end receives the non-legacy field of the preamble according to the power enhancement information.

In this embodiment, transmit power enhancement processing is performed on a non-legacy field of a preamble in a wireless local area network (WLAN) system, which can improve an overall throughput rate of the system, so that data transmission performance and user experience can be enhanced.

A frame structure of a Wi-Fi system mainly includes a preamble, a service field, a data field, a trailer field, and the like. The preamble mainly implements functions such as frame detection, automatic gain control, a frequency offset estimation, time synchronization, and a channel estimation. The preamble may be divided into a legacy field part and a non-legacy field part.

Generally, the legacy field part of the preamble includes three fields, that is, an L-STF, an L-LTF, and an L-SIG field. The L-STF is used for frame start detection, automatic gain control (AGC) setting, an initial frequency offset estimation, and initial time synchronization. The L-LTF is used for a more precise frequency offset estimation and more precise time synchronization, and is also used to receive and balance the L-SIG field and generate a channel estimation result. The L-SIG field is mainly used to carry data rate information and data length information, so that the receive end can determine, according to the data rate information and the data length information, a length of data that is carried in a same frame as the preamble, so that a proper period of idle time can be determined.

The non-legacy field part may be a field, in the preamble, except the foregoing legacy field part. Fields specifically included in the non-legacy field part depend on a version of an IEEE 802.11 standard. For example, in the IEEE 802.11n standard, the non-legacy field part includes a high throughput signal HT-SIG field, a high throughput short training field HT-STF, a high throughput long training field HT-LTF, and the like.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

Optionally, the target field is a field that is determined by the transmit end and on which transmit power enhancement needs to be performed. Specifically, the transmit end may determine one or more target fields from the foregoing non-legacy field part according to a system status and a service requirement. A PAPR corresponding to the target field is less than a transmit power amplification limit of the transmit end. In addition, in this embodiment, the transmit end may determine the transmit power amplification limit.

Optionally, the transmit power amplification limit is determined according to a maximum output power of a power amplifier used by the transmit end.

Specifically, a power amplifier generally has a linear range. Within the linear range, a ratio of an output power to an input power linearly increases. However, when the input power exceeds a specific threshold, an effect of power amplification obviously weakens, and if the input power continues to increase, the output power remains unchanged. That is, the power amplifier has a maximum output power (recorded as $P_{max}$), or there is an inflection point on a curve of the ratio of the output power to the input power, and an output power and an input power of a part after the inflection point are basically the same. Therefore, an effect of power amplification without distortion cannot be achieved. In this embodiment, as an example instead of a limitation, the foregoing transmit power amplification limit may be determined according to the foregoing maximum output power.

For example, before a selected target field signal enters the power amplifier, assuming that an average power of the target field signal is $P_1$, and a peak power of the target field signal is $P_2$, a PAPR (recorded as $\beta$) of the target field signal may be indicated by $\beta=P_2/P_1$, that is, $$P_2=P_1 \cdot \beta \quad (1)$$

Assuming that an amplification multiple of the power amplifier is x, an average transmit power of the signal that is obtained after amplification is performed by the power amplifier is $P_1 \cdot x$. In addition, in a communications system, an average power of a transmit signal should meet a regulation of the standard, that is, the average power of the transmit signal should be less than or equal to a maximum average transmit power $P_{standard}$ specified in the standard. Generally, the signal is transmitted at full power, that is, $$P_1 \cdot x = P_{standard} \quad (2)$$

According to the foregoing limitation of the power amplifier, the following needs to be met:

$$P_2 \cdot x < P_{max} \quad (3)$$

Therefore, it may be learned from formulas (1), (2), and (3) that $\beta < P_{max}/P_{standard}$. Therefore, the transmit end may determine the foregoing transmit power amplification limit according to the maximum output power of the power amplifier used by the transmit end and the maximum average transmit power of the signal. For example, a value of $P_{max}/P_{standard}$ may be used as the foregoing transmit power amplification limit. In addition, the transmit power amplification limit generally may be, for example, 8 dB.

It should be understood that the foregoing method for determining the transmit power amplification limit and the foregoing value of the transmit power amplification limit are merely for exemplary description, and the present disclosure is not limited thereto. For example, alternatively, the transmit power amplification limit may be less than the value of $P_{max}/P_{standard}$ or greater than the value of $P_{max}/P_{standard}$, which is not specially limited in the present disclosure.

Optionally, in an embodiment, the power enhancement information is used to indicate a power enhancement amount of the target field, and the power enhancement amount is determined by the transmit end according to a peak-to-average power ratio (PAPR) corresponding to the target field and the transmit power amplification limit of the transmit end.

It should be understood that the PAPR corresponding to the target field may be determined according to a system bandwidth. The foregoing Table 1 is still used as an example for description. The foregoing Table 1 shows PAPR values of some fields of an IEEE 802.11n preamble in a case of a system bandwidth of 20 MHz. When the system bandwidth is 20 MHz, and the target field is an HT-LTF, it may be determined that a PAPR value corresponding to the target field is 3.2245. It should be understood that the foregoing correspondence between the system bandwidth and a PAPR value of each field may be stored at the transmit end in advance, and the transmit end may directly acquire, read, or invoke, according to the system bandwidth, a PAPR value corresponding to a target field.

The transmit end may determine, according to the power amplifier used by the transmit end, a limit to which the transmit end can perform power amplification. For example, in the foregoing IEEE 802.11n scenario in which the system bandwidth is 20 MHz, the transmit power amplification limit of the power amplifier is 8 dB, that is, if a PAPR of a preamble exceeds 8 dB, a transmit signal is obviously distorted, which causes a decrease in system performance. The power enhancement amount of the target field is determined according to the peak-to-average power ratio (PAPR) corresponding to the target field and the transmit power amplification limit of the transmit end. An amount by which power enhancement can be performed on the target field is 8−3.2245 dB, and the transmit end may determine any power enhancement amount less than the amount by which power enhancement can be performed. For example, the transmit end may determine that the power enhancement amount is 4 dB. It should be understood that the transmit end may determine a proper power enhancement amount according to a system status, a service requirement, and the like. Specifically, when system load is relatively low, a relatively small power enhancement amount may be determined; when system load is relatively high, a relatively large power enhancement amount may be determined, which is not limited in the present disclosure.

It should further be understood that the power enhancement amount may be an actual power enhancement value, or may be a power enhancement factor. For example, if the power enhancement factor is $\alpha$, the actual power enhancement value may be $20 \cdot \log_{10}(\alpha)$ dB.

After the power enhancement amount of the target field is determined, a baseband waveform of the target field may be generated according to the power enhancement amount by using the following formula:

$$r_{NL-LTF}^{n,i_{TX}}(t) = \frac{\alpha}{\sqrt{N_{STS} \cdot N_{NL-LTF}^{Tone}}} w_{T_{NL-LTFs}}(t) \cdot \sum_{k=-N_{SR}}^{N_{SR}} \sum_{i_{STS}=1}^{N_{STS}} [Q_k]_{i_{TX}, i_{STS}} [P_{NLLTF}]_{i_{STS}, n}$$

$$\gamma_k NLLTF_k \exp(j2\pi k \Delta_F (t - T_{GI} - T_{CS}^{i_{STS}})),$$

where

NLLTF indicates a non-legacy LTF subcarrier value, $T_{CS}^{i_{STS}}$ indicates a circular delay value, $T_{GI}$ indicates a guard interval value, $P_{NLLTF}$ indicates a flow mapping matrix, $Q_k$ indicates a space mapping matrix, $\gamma_k$ indicates a frequency domain rotation value, $N_{STS}$ indicates a quantity of space time flows, $N_{NL-LTF}^{Tone}$ indicates a quantity of subcarriers in use, $w_{T_{NL-LTFs}}(t)$ indicates a time domain window function, and $\alpha$ is a transmit power enhancement factor. If transmit power enhancement is not performed, $\alpha=1$; if transmit power enhancement is performed, a transmit power enhancement value is $20 \cdot \log_{10}(\alpha)$ dB.

Optionally, in an embodiment, when the target field is a long training field (LTF), the receiving, by the receive end, the non-legacy field of the preamble according to the power enhancement information includes performing a multi-input multi-output (MIMO) channel estimation according to the power enhancement amount of the target field that is indicated by the power enhancement information, and receiving subsequent data and a subsequent field according to a result of the MIMO channel estimation. The subsequent field and the subsequent data may include a remaining non-legacy field in the non-legacy field part of the preamble and subsequently transmitted data. In an embodiment, when the target field is a long training field (LTF) in a non-legacy field, because the LTF generally has a MIMO channel estimation function, improving a transmit power of the LTF can enhance accuracy of a MIMO channel estimation and reduce a frame error rate of the system, so that an objective of enhancing system performance and user experience can be achieved. It should be understood that LTFs in a non-legacy field may be different according to different versions of the standard. A specific example is that in IEEE 802.11n, the target field may be a high throughput long training field HT-LTF.

Specifically, the transmit end may add the power enhancement information to the non-legacy signal field such as an HT-SIG field, to indicate transmit power enhancement of the target field. The receive end may perform a MIMO channel estimation according to the actual power enhancement value, and finally complete receiving of subsequent data and a subsequent field. The subsequent field and the subsequent data may include a remaining non-legacy field in the non-legacy field part of the preamble and subsequently transmitted data.

The power enhancement information may indicate whether a transmit power of the target field has been enhanced. For example, "000" may be used to indicate that transmit power enhancement has not been performed on the target field, and "001" may be used to indicate that transmit power enhancement has been performed on the target field. The power enhancement information may further indicate the power enhancement amount of the target field. For example, "001" may indicate that the transmit power is enhanced by 1 dB, "010" may indicate that the transmit power is enhanced by 2 dB, "011" may indicate that the transmit power is enhanced by 3 dB, and the rest can be deduced by analogy. It should be understood that the power enhancement information may occupy more or less bits to describe related information of transmit power enhancement, which is not limited in the present disclosure.

In this embodiment, transmit power enhancement processing is performed on a non-legacy field of a preamble in a wireless local area network (WLAN) system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that a peer end can acquire the power enhancement information, and perform a channel estimation according to the power enhancement information; therefore, accuracy of receiving a subsequent field is enhanced.

Figure 3:
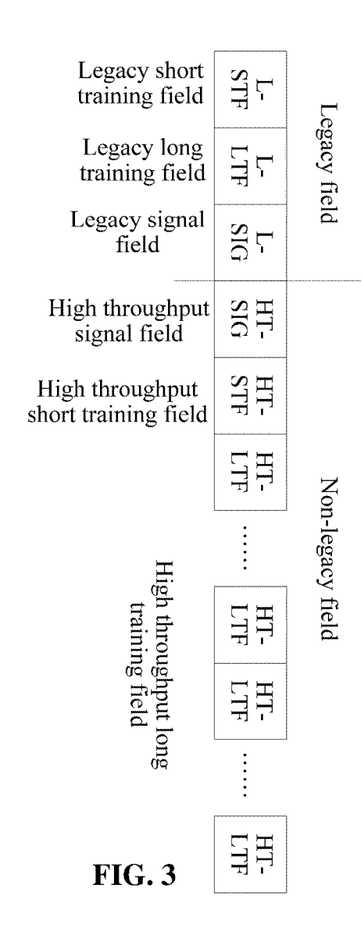
FIG. 3 is a schematic diagram of a preamble according to an embodiment.

FIG. 3 is a schematic diagram of a preamble according to an embodiment.

FIG. 3 shows a preamble of a hybrid format in the IEEE 802.11n standard, and the preamble specifically includes a legacy short training field, a legacy long training field, a legacy signal field, a high throughput signal field, a high throughput short training field, a high throughput long training field, and the like. The high throughput signal field, the high throughput short training field, and the high throughput long training field are non-legacy fields. Two symbols of the high throughput signal field may be used to carry power enhancement information in the foregoing embodiment, to indicate power enhancement of a non-legacy field following the high throughput signal field. A transmit end may determine that one or two fields in the high throughput short training field and the high throughput long training field are target fields for power enhancement.

Figure 4:
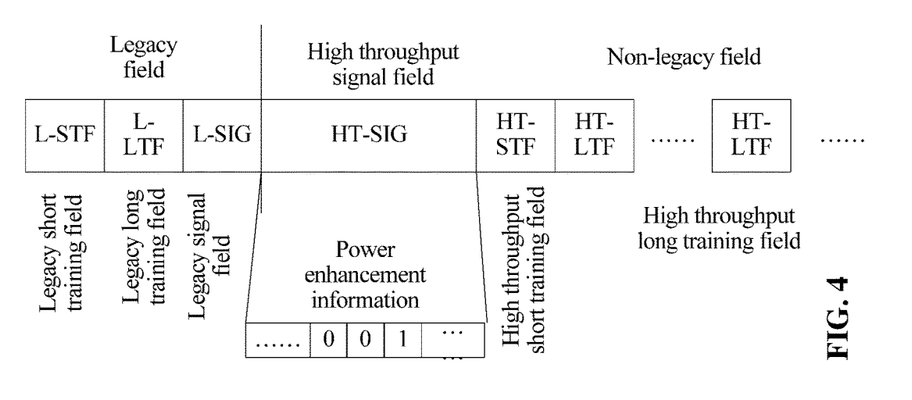
FIG. 4 is a schematic diagram of a bit in power enhancement information according to an embodiment.

FIG. 4 is a schematic diagram of a bit in power enhancement information according to an embodiment. FIG. 4 shows a schematic diagram of power enhancement information that is similar to a preamble in FIG. 3. The power enhancement information may indicate whether a transmit power of a target field has been enhanced. For example, "000" may be used to indicate that transmit power enhancement has not been performed on the target field, and "001" in FIG. 4 may be used to indicate that transmit power enhancement has been performed on the target field. The power enhancement information may further indicate a power enhancement amount of the target field. For example, "011" may indicate that the transmit power is enhanced by 1 dB, "010" may indicate that the transmit power is enhanced by 2 dB, "011" may indicate that the transmit power is enhanced by 3 dB, "100" may indicate that the transmit power is enhanced by 4 dB, and the rest can be deduced by analogy. It should be understood that the power enhancement information may occupy more or less bits to describe related information of transmit power enhancement, which is not limited in the present disclosure.

In an example, a transmit power of a high throughput long training field is improved. A frequency domain expression of the HT-LTF may be:

$$u_{N_{Tx},N_{DLTF}} = Q_{N_{Tx},N_{STS}} \cdot M_{N_{STS},N_{STS}} \cdot P_{N_{STS},N_{DLTF}} \cdot \alpha \cdot HTLTF_k$$

where k indicates a carrier indicator, $N_{STS}$ is a quantity of space time flows, $N_{DLTF}$ is a quantity of HT-LTF-OFDM symbols used for a MIMO channel estimation, $N_{Tx}$ is a quantity of transmit antennas, $HTLTF_k$ is HT-LTF data on a carrier k, $P_{N_{STS},N_{DLTF}}$ is an HT-LTF flow mapping matrix, $M_{N_{STS},N_{STS}}$ is a CSD mapping matrix, $Q_{N_{Tx},N_{STS}}$ is a space mapping matrix, and $\alpha$ is a transmit power enhancement factor. When the transmit power is enhanced by 4 dB, $\alpha=1.585$.

It is specified in the standard that a P matrix is as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

$$P_{N_{STS},N_{DLTF}} = P_{4\times 4(1:N_{STS}, 1:N_{DLTF})}$$

A relationship between $N_{STS}$ and $N_{DLTF}$ is specified as follows:

| $N_{STS}$ | $N_{DLTF}$ |
| --- | --- |
| 1 | 1 |
| 2 | 2 |
| 3 | 4 |
| 4 | 4 |

If four space time flows are used, if the transmit power is enhanced by 4 dB, a final HT-LTF time domain waveform formula may be indicated as follows:

$$r_{HT-LTF}^{n,i_{TX}}(t) = \frac{1.585}{\sqrt{4.56}} w_{T_{NL-LTFs}}(t) \cdot \sum_{k=-28}^{28} \sum_{i_{STS}=1}^{4} [Q_k]_{i_{TX},i_{STS}} [P_{HTLTF}]_{i_{STS},n}$$
$$HTLTF_k \exp\left(j2\pi k \Delta_F(t - T_{GI} - T_{CS}^{i_{STS}})\right)$$

At a receive end, after detecting a transfer frame, a site first extracts, from an HT-SIG field of the received frame, a corresponding information bit related to power enhancement. If the read power enhancement information bit is "100", it indicates that transmit power enhancement has been performed on the HT-LTF, and an actual transmit power enhancement value is 4 dB. It may be learned from a formula $20 \cdot \log_{10}(\alpha) = 4$ dB that $\alpha = 1.585$.

Subsequently, a MIMO channel parameter estimation is performed according to the power enhancement value, and an LS channel estimation algorithm is used. The following may be learned from content of the P matrix and the relationship between $N_{STS}$ and $N_{DLTF}$:

$$I_{N_{STS},N_{STS}} = \frac{1}{N_{DLTF}} \cdot P_{N_{STS},N_{DLTF}} \cdot P_{N_{DLTF},N_{STS}}^T,$$

where $I_{N_{STS},N_{STS}}$ is an identity matrix of $N_{STS} \times N_{STS}$.

By using received HT-LTF data, a frequency domain expression of the received HT-LTF can be easily obtained as follows:

$$y_{N_{Rx},N_{DLTF}} = H_{N_{Rx},N_{Tx}} \cdot u_{N_{Tx},N_{DLTF}} + z_{N_{Rx},N_{DLTF}}$$
$$= H_{N_{Rx},N_{Tx}} \cdot Q_{N_{Tx},N_{STS}} \cdot M_{N_{STS},N_{STS}} \cdot P_{N_{STS},N_{DLTF}} \cdot \alpha \cdot$$
$$HTLTF_k + z_{N_{Rx},N_{DLTF}}$$
$$= \tilde{H}_{N_{Rx},N_{STS}} \cdot P_{N_{STS},N_{DLTF}} \cdot \alpha \cdot HTLTF_k + z_{N_{Rx},N_{DLTF}},$$

where $H_{N_{Rx},N_{Tx}}$ is a channel matrix, and $Z_{N_{Rx},N_{DLTF}}$ is a noise matrix. An equivalent channel matrix is denoted as follows:

$$\tilde{H}_{N_{Rx},N_{STS}} = H_{N_{Rx},N_{Tx}} \cdot Q_{N_{Tx},N_{STS}} \cdot M_{N_{STS},N_{STS}}$$

By using known $P_{N_{STS},N_{DLTF}}$ and $HTLTF_k$, an estimation value of an equivalent channel matrix $\tilde{H}_{N_{Rx},N_{STS}}$ on the carrier k may be obtained, and is denoted as follows:

$$\hat{H}_{N_{Rx},N_{STS}} = \frac{1}{\alpha \cdot HTLTF_k \cdot N_{DTLF}} \cdot y_{N_{Rx},N_{DLTF}} \cdot P^T_{N_{DLTF},N_{STS}}$$

$$= \frac{\tilde{H}_{N_{Rx},N_{STS}} \cdot P_{N_{STS},N_{DLTF}} \cdot \alpha \cdot HTLTF_k + z_{N_{Rx},N_{DLTF}}}{\alpha \cdot HTLTF_k \cdot N_{DTLF}} \cdot$$

$$P^T_{N_{DLTF},N_{STS}}$$

$$= \tilde{H}_{N_{Rx},N_{STS}} + \frac{z_{N_{Rx},N_{DLTF}} \cdot P^T_{N_{DLTF},N_{STS}}}{\alpha \cdot HTLTF_k \cdot N_{DTLF}}$$

$$= \tilde{H}_{N_{Rx},N_{STS}} + \tilde{z}_{N_{Rx},N_{STS}}$$

Obviously, a term including noise is suppressed due to the power enhancement factor α=1.585. Then, receiving of all frames is completed by using the MIMO channel estimation parameter.

Figure 5:
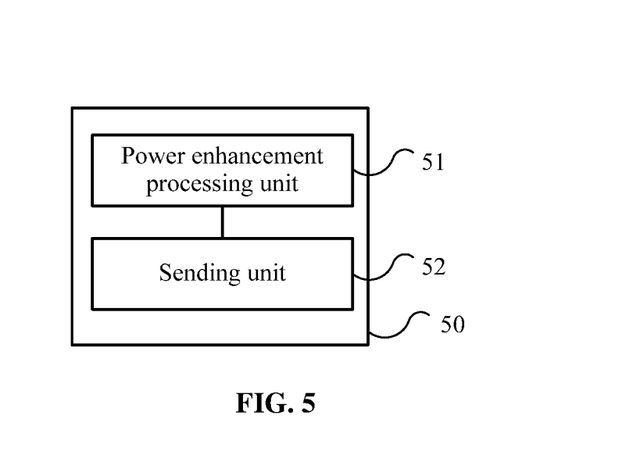
FIG. 5 is a schematic block diagram of a transmit end according to an embodiment.

FIG. 5 is a schematic block diagram of a transmit end according to an embodiment. In FIG. 5, the transmit end 50 includes a power enhancement processing unit 51 and a sending unit 52.

The power enhancement processing unit 51 performs transmit power enhancement processing on a target field of a preamble in a wireless local area network (WLAN) system, where the target field may be one or more fields, except a non-legacy signal field, in a non-legacy field of the preamble in the WLAN system. The sending unit 52 sends to a receive end the preamble on which transmit power enhancement processing has been performed.

In this embodiment, the transmit end 50 performs transmit power enhancement processing on a non-legacy field of a preamble in a wireless local area network (WLAN) system, which can improve an overall throughput rate of the system, so that data transmission performance and user experience can be enhanced.

A frame structure of a Wi-Fi system mainly includes a preamble, a service field, a data field, a trailer field, and the like. The preamble mainly implements functions such as frame detection, automatic gain control, a frequency offset estimation, time synchronization, and a channel estimation. The preamble may be divided into a legacy field part and a non-legacy field part.

Generally, the legacy field part of the preamble includes three fields, that is, an L-STF, an L-LTF, and an L-SIG field. The non-legacy field part may be a field, in the preamble, except the foregoing legacy field part. Fields specifically included in the non-legacy field part depend on a version of an IEEE 802.11 standard. For example, in the IEEE 802.11n standard, the non-legacy field part includes a high throughput signal (HT-SIG) field, a high throughput short training field (HT-STF), a high throughput long training field (HT-LTF), and the like.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

Optionally, the transmit end 50 first needs to determine a target field on which transmit power enhancement is to be performed. Specifically, one or more target fields may be determined from the foregoing non-legacy field part according to a system status and a service requirement, where a PAPR corresponding to the target field is less than a transmit power amplification limit of the transmit end 50. In addition, in this embodiment, the transmit end 50 may determine the transmit power amplification limit.

Optionally, the transmit power amplification limit is determined according to a maximum output power of a power amplifier used by the transmit end 50.

Optionally, in an embodiment, the power enhancement processing unit 51 is configured to determine a power enhancement amount of the target field according to a peak-to-average power ratio (PAPR) corresponding to the target field and the transmit power amplification limit of the transmit end 50, and generate a baseband signal of the target field according to the power enhancement amount of the target field.

It should be understood that the PAPR corresponding to the target field may be determined according to a system bandwidth. The foregoing Table 1 is still used as an example for description. The foregoing Table 1 shows PAPR values of some fields of an IEEE 802.11n preamble in a case of a system bandwidth of 20 MHz. When the system bandwidth is 20 MHz, and the target field is an HT-LTF, it may be determined that a PAPR value corresponding to the target field is 3.2245. It should be understood that the foregoing correspondence between the system bandwidth and a PAPR value of each field may be stored at the transmit end 50 in advance, and the transmit end 50 may directly acquire, read, or invoke, according to the system bandwidth, a PAPR value corresponding to a target field.

The transmit end 50 may determine, according to the power amplifier used by the transmit end 50, a limit to which the transmit end 50 can perform power amplification. For example, in the foregoing IEEE 802.11n scenario in which the system bandwidth is 20 MHz, the transmit power amplification limit of the power amplifier is 8 dB, that is, if a PAPR of a preamble exceeds 8 dB, a transmit signal is obviously distorted, which causes a decrease in system performance. The power enhancement amount of the target field is determined according to the peak-to-average power ratio PAPR corresponding to the target field and the transmit power amplification limit of the transmit end 50. An amount by which power enhancement can be performed on the target field is 8-3.2245 dB, and the transmit end 50 may determine any power enhancement amount less than the amount by which power enhancement can be performed. For example, the transmit end 50 may determine that the power enhancement amount is 4 dB. It should be understood that the transmit end 50 may determine a proper power enhancement amount according to a system status, a service requirement, and the like. Specifically, when system load is relatively low, a relatively small power enhancement amount may be determined; when system load is relatively high, a relatively large power enhancement amount may be determined, which is not limited in the present disclosure.

It should further be understood that the power enhancement amount may be an actual power enhancement value, or may be a power enhancement factor. For example, if the power enhancement factor is α, the actual power enhancement value may be $20 \cdot \log_{10}(\alpha)$ dB.

After the power enhancement amount of the target field is determined, the baseband waveform of the target field may be generated according to the power enhancement amount. For details, refer to the foregoing baseband waveform formula in the embodiment in FIG. 1, and details are not described herein again.

Optionally, in an embodiment, the power enhancement processing unit 51 is further configured to add power enhancement information to a non-legacy signal field of the preamble, where the power enhancement information is used to indicate whether power enhancement processing has been performed on the target field, and if power enhancement processing has been performed on the target field, the power enhancement information is further used to indicate the power enhancement amount of the target field.

The transmit end 50 may add the power enhancement information to the non-legacy signal field such as an HT-SIG field, to indicate transmit power enhancement of the target field. The power enhancement information may indicate whether a transmit power of the target field has been enhanced. For example, "000" may be used to indicate that transmit power enhancement has not been performed on the target field, and "001" may be used to indicate that transmit power enhancement has been performed on the target field. The power enhancement information may further indicate the power enhancement amount of the target field. For example, "001" may indicate that the transmit power is enhanced by 1 dB, "010" may indicate that the transmit power is enhanced by 2 dB, "011" may indicate that the transmit power is enhanced by 3 dB, and the rest can be deduced by analogy. It should be understood that the power enhancement information may occupy more or less bits to describe related information of transmit power enhancement, which is not limited in the present disclosure.

Optionally, in an embodiment, the PAPR corresponding to the target field is less than a threshold, and the threshold is less than the transmit power amplification limit of the transmit end 50.

In an embodiment, the target field may be a field with a relatively low PAPR. For a field with a relatively low PAPR, there is much room for power enhancement, that is, there is also much room for enhancing system performance. Specifically, the system or the transmit end 50 may preset the threshold, and the threshold is less than the transmit power amplification limit of the transmit end 50. It may be determined that a field in the non-legacy field whose PAPR is less than the threshold is a target field on which power enhancement is to be performed. For example, the example in the foregoing embodiment continues to be described. If the transmit power amplification limit of the transmit end 50 is 8 dB, and the system or the transmit end 50 presets the threshold to 5, it may be determined that a non-legacy field whose PAPR value is less than 5 is the target field. In the foregoing Table 1, fields that meet the condition are an HT-STF and an HT-LTF.

Optionally, the target field includes a long training field LTF. In an embodiment, when the target field is a long training field LTF in a non-legacy field, because the LTF generally has a MIMO channel estimation function, improving a transmit power of the LTF can enhance accuracy of a MIMO channel estimation and reduce a frame error rate of the system, so that an objective of enhancing system performance and user experience can be achieved. It should be understood that LTFs in a non-legacy field may be different according to different versions of the standard. A specific example is that in IEEE 802.11n, the target field may be a high throughput long training field HT-LTF.

In this embodiment of the present disclosure, the transmit end 50 performs transmit power enhancement processing on a non-legacy field of a preamble in a wireless local area network WLAN system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that a peer end can acquire the power enhancement information, and perform a channel estimation according to the power enhancement information; therefore, accuracy of receiving a subsequent field is enhanced.

Figure 6:
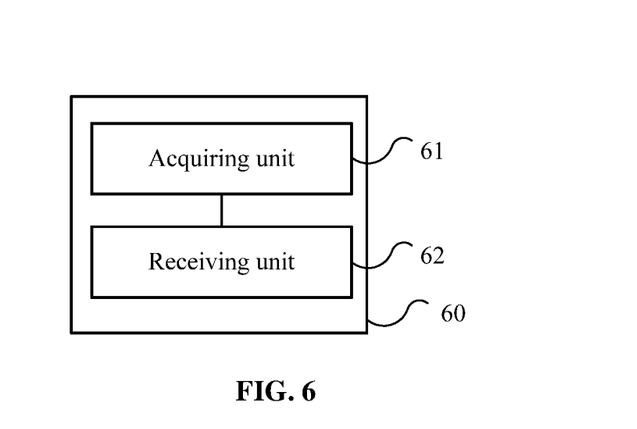
FIG. 6 is a schematic block diagram of a receive end according to an embodiment.

FIG. 6 is a schematic block diagram of a receive end according to an embodiment. In FIG. 6, the receive end 60 includes an acquiring unit 61 and a receiving unit 62.

The acquiring unit 61 acquires power enhancement information in a non-legacy signal field of a preamble in a wireless local area network WLAN system. The power enhancement information is used to indicate that a transmit end has performed transmit power enhancement processing on a target field of the preamble, and the target field may be one or more fields, except a non-legacy signal field, in a non-legacy field of the preamble in the WLAN system. The receiving unit 62 receives the non-legacy field of the preamble according to the power enhancement information.

In this embodiment, transmit power enhancement processing is performed on a non-legacy field of a preamble in a wireless local area network WLAN system, which can improve an overall throughput rate of the system, so that data transmission performance and user experience can be enhanced.

A frame structure of a Wi-Fi system mainly includes a preamble, a service field, a data field, a trailer field, and the like. The preamble mainly implements functions such as frame detection, automatic gain control, a frequency offset estimation, time synchronization, and a channel estimation. The preamble may be divided into a legacy field part and a non-legacy field part.

Generally, the legacy field part of the preamble includes three fields, that is, an L-STF, an L-LTF, and an L-SIG field. The L-STF is used for frame start detection, automatic gain control AGC setting, an initial frequency offset estimation, and initial time synchronization. The L-LTF is used for a more precise frequency offset estimation and more precise time synchronization, and is also used to receive and balance the L-SIG field and generate a channel estimation result. The L-SIG field is mainly used to carry data rate information and data length information, so that the receive end 60 can determine, according to the data rate information and the data length information, a length of data that is carried in a same frame as the preamble, so that a proper period of idle time can be determined.

The non-legacy field part may be a field, in the preamble, except the foregoing legacy field part. Fields specifically included in the non-legacy field part depend on a version of an IEEE 802.11 standard. For example, in the IEEE 802.11n standard, the non-legacy field part includes a high throughput signal HT-SIG field, a high throughput short training field HT-STF, a high throughput long training field HT-LTF, and the like.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

Optionally, the target field is a field that is determined by the transmit end and on which transmit power enhancement needs to be performed. Specifically, the transmit end may determine one or more target fields from the foregoing non-legacy field part according to a system status and a service requirement, where a PAPR corresponding to the target field is less than a transmit power amplification limit of the transmit end. In addition, in this embodiment, the transmit end may determine the transmit power amplification limit.

Optionally, the transmit power amplification limit is determined according to a maximum output power of a power amplifier used by the transmit end.

Optionally, in an embodiment, the power enhancement information is used to indicate a power enhancement amount of the target field, and the power enhancement amount is determined by the transmit end according to a peak-to-average power ratio PAPR corresponding to the target field and the transmit power amplification limit of the transmit end.

It should be understood that the PAPR corresponding to the target field may be determined according to a system bandwidth. The foregoing Table 1 is still used as an example for description. The foregoing Table 1 shows PAPR values of some fields of an IEEE 802.11n preamble in a case of a system bandwidth of 20 MHz. When the system bandwidth is 20 MHz, and the target field is an HT-LTF, it may be determined that a PAPR value corresponding to the target field is 3.2245. It should be understood that the foregoing correspondence between the system bandwidth and a PAPR value of each field may be stored at the transmit end in advance, and the transmit end may directly acquire, read, or invoke, according to the system bandwidth, a PAPR value corresponding to a target field.

The transmit end may determine, according to the power amplifier used by the transmit end, a limit to which the transmit end can perform power amplification. For example, in the foregoing IEEE 802.11n scenario in which the system bandwidth is 20 MHz, the transmit power amplification limit of the power amplifier is 8 dB, that is, if a PAPR of a preamble exceeds 8 dB, a transmit signal is obviously distorted, which causes a decrease in system performance. The power enhancement amount of the target field is determined according to the peak-to-average power ratio PAPR corresponding to the target field and the transmit power amplification limit of the transmit end. An amount by which power enhancement can be performed on the target field is 8-3.2245 dB, and the transmit end may determine any power enhancement amount less than the amount by which power enhancement can be performed. For example, the transmit end may determine that the power enhancement amount is 4 dB. It should be understood that the transmit end may determine a proper power enhancement amount according to a system status, a service requirement, and the like. Specifically, when system load is relatively low, a relatively small power enhancement amount may be determined. When system load is relatively high, a relatively large power enhancement amount may be determined, which is not limited in the present disclosure.

It should further be understood that the power enhancement amount may be an actual power enhancement value, or may be a power enhancement factor. For example, if the power enhancement factor is α, the actual power enhancement value may be $20 \cdot \log_{10}(\alpha)$ dB.

After the power enhancement amount of the target field is determined, a baseband waveform of the target field may be generated according to the power enhancement amount. For details, refer to the foregoing baseband waveform formula in the embodiment in FIG. 1, and details are not described herein again.

Optionally, in an embodiment, when the target field is a long training field LTF, the receive end 60 further includes a channel estimation unit. The receiving unit 62 is configured to perform, by using the channel estimation unit, a multi-input multi-output (MIMO) channel estimation according to the power enhancement amount of the target field that is indicated by the power enhancement information. The receiving unit 62 is also configured to receive subsequent data and a subsequent field according to a result of the MIMO channel estimation. The subsequent field and the subsequent data may include a remaining non-legacy field in the non-legacy field part of the preamble and subsequently transmitted data.

In an embodiment, when the target field is a long training field LTF in a non-legacy field, because the LTF generally has a MIMO channel estimation function, improving a transmit power of the LTF can enhance accuracy of a MIMO channel estimation and reduce a frame error rate of the system, so that an objective of enhancing system performance and user experience can be achieved. It should be understood that LTFs in a non-legacy field may be different according to different versions of the standard. A specific example is that in IEEE 802.11n, the target field may be a high throughput long training field HT-LTF.

Specifically, the transmit end may add the power enhancement information to the non-legacy signal field such as an HT-SIG field, to indicate transmit power enhancement of the target field. The receive end 60 may perform a MIMO channel estimation according to the actual power enhancement value, and finally complete receiving of all frames.

The power enhancement information may indicate whether a transmit power of the target field has been enhanced. For example, "000" may be used to indicate that transmit power enhancement has not been performed on the target field, and "001" may be used to indicate that transmit power enhancement has been performed on the target field. The power enhancement information may further indicate the power enhancement amount of the target field. For example, "001" may indicate that the transmit power is enhanced by 1 dB, "010" may indicate that the transmit power is enhanced by 2 dB, "on" may indicate that the transmit power is enhanced by 3 dB, and the rest can be deduced by analogy. It should be understood that the power enhancement information may occupy more or less bits to describe related information of transmit power enhancement, which is not limited in the present disclosure.

In this embodiment, transmit power enhancement processing is performed on a non-legacy field of a preamble in a wireless local area network WLAN system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that the receive end 60 can acquire the power enhancement information, and perform a channel estimation according to the power enhancement information; therefore, accuracy of receiving a subsequent field is enhanced.

Figure 7:
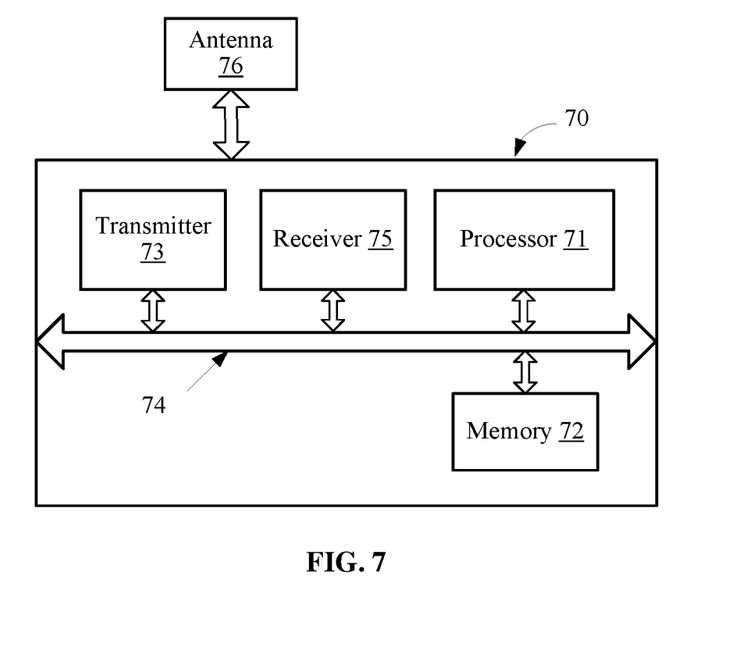
FIG. 7 is a schematic block diagram of a transmit end according to another embodiment.

FIG. 7 is a schematic block diagram of a transmit end according to another embodiment. In FIG. 7, the transmit end 70 includes a processor 71, a memory 72, and a transmitter 73. The processor 71, the memory 72, and the transmitter 73 are connected to each other by using a bus system 74.

The memory 72 is configured to store instructions used by the processor 71 to execute the following operations of performing transmit power enhancement processing on a target field of a preamble in a wireless local area network WLAN system. The target field may be one or more fields, except a non-legacy signal field, in a non-legacy field of the preamble in the WLAN system. The instructions also cause the processor 71 to execute sending a receive end the preamble on which transmit power enhancement processing has been performed.

In this embodiment, the transmit end 70 performs transmit power enhancement processing on a non-legacy field of a preamble in a wireless local area network WLAN system, which can improve an overall throughput rate of the system, so that data transmission performance and user experience can be enhanced.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

In addition, the transmit end 70 may include a receiver 75, an antenna 76, and the like. The processor 71 controls an operation of the transmit end 70, and the processor 71 may further be referred to as a CPU (Central Processing Unit). The memory 72 may include a read-only memory and a random access memory, and provides an instruction and data to the processor 71. A part of the memory 72 may further include a non-volatile random access memory (NVRAM). In a specific application, the transmitter 73 and the receiver 75 may be coupled to the antenna 76. Components of the transmit end 70 are coupled together by using the bus system 74, where in addition to a data bus, the bus system 74 includes a power bus, a control bus, a status signal bus, and the like. However, for clear description, various types of buses in the figure are marked as the bus system 74.

The methods disclosed in the foregoing embodiments may be applied to the processor 71 or implemented by the processor 71. The processor 71 may be an integrated circuit chip and has a signal processing capability. In an implementation process, steps of the foregoing methods may be implemented by using an integrated logic circuit of hardware in the processor 71 or an instruction in a form of software. The foregoing processor 71 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 71 may implement or execute methods, steps and logical block diagrams disclosed in the embodiments. The general purpose processor may be a microprocessor or the processor may be any conventional processor and the like. Steps of the methods disclosed with reference to the embodiments may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 72, and the processor 71 reads information in the memory 72 and completes the steps in the foregoing methods in combination with hardware of the processor 71.

It should be understood that the processor 71 may implement a function of the foregoing power enhancement processing unit 51 in the embodiment corresponding to FIG. 5. The transmitter 73 may implement a function of the foregoing sending unit 52 in the embodiment corresponding to FIG. 5.

Optionally, in an embodiment, the performing, by the transmit end, transmit power enhancement processing on the target field of the preamble in the wireless local area network WLAN system includes determining a power enhancement amount of the target field according to a peak-to-average power ratio PAPR corresponding to the target field and a transmit power amplification limit of the transmit end. The performing also includes generating a baseband signal of the target field according to the power enhancement amount of the target field.

Optionally, in an embodiment, the performing, by the transmit end, transmit power enhancement processing on the target field of the preamble in the wireless local area network WLAN system further includes adding power enhancement information to a non-legacy signal field of the preamble. The power enhancement information is used to indicate whether power enhancement processing has been performed on the target field. If power enhancement processing has been performed on the target field, the power enhancement information is further used to indicate the power enhancement amount of the target field.

Optionally, in an embodiment, the PAPR corresponding to the target field is less than a threshold, and the threshold is less than the transmit power amplification limit of the transmit end.

In this embodiment, the transmit end 70 performs transmit power enhancement processing on a non-legacy field of a preamble in a wireless local area network WLAN system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that a peer end can acquire the power enhancement information, and perform a channel estimation according to the power enhancement information; therefore, accuracy of receiving a subsequent field is enhanced.

Figure 8:
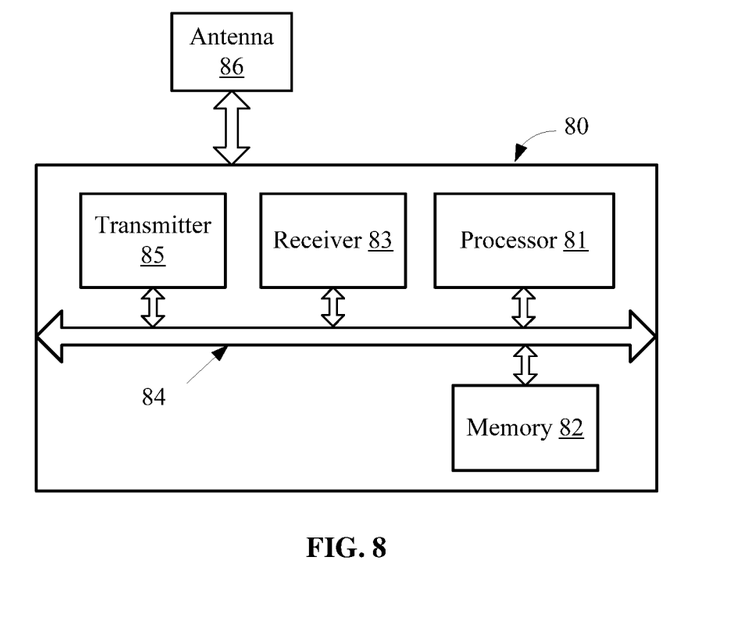
FIG. 8 is a schematic block diagram of a receive end according to another embodiment.

FIG. 8 is a schematic block diagram of a receive end according to another embodiment. In FIG. 8, the receive end 80 includes a processor 81, a memory 82, and a receiver 83. The processor 81, the memory 82, and the receiver 83 are connected to each other by using a bus system 84.

The memory 82 is configured to store instructions used by the processor 81 to execute the following operations acquiring power enhancement information in a non-legacy signal field of a preamble in a wireless local area network WLAN system. The power enhancement information is used to indicate that a transmit end has performed transmit power enhancement processing on a target field of the preamble, and the target field may be one or more fields, except a non-legacy signal field, in a non-legacy field of the preamble in the WLAN system. The instructions also cause the processor 81 to execute the operation of receiving the non-legacy field of the preamble according to the power enhancement information.

In this embodiment, transmit power enhancement processing is performed on a non-legacy field of a preamble in a wireless local area network WLAN system, which can improve an overall throughput rate of the system, so that data transmission performance and user experience can be enhanced.

The target field may be any field or a plurality of fields, except a non-legacy signal field, in the non-legacy field. For example, the target field may be a field such as an HT-STF or an HT-LTF, which specifically depends on a specific version of the standard. It should be noted that in this embodiment, power enhancement processing is performed on a target field that belongs to a non-legacy field, and whether power enhancement is performed on a legacy field is not limited.

In addition, the receive end 80 may include a transmitter 85, an antenna 86, and the like. The processor 81 controls an operation of the receive end 80, and the processor 81 may further be referred to as a CPU (Central Processing Unit). The memory 82 may include a read-only memory and a random access memory, and provides an instruction and data to the processor 81. A part of the memory 82 may further include a non-volatile random access memory (NVRAM). In a specific application, the transmitter 85 and the receiver 83 may be coupled to the antenna 86. Components of the receive end 80 are coupled together by using the bus system 84, where in addition to a data bus, the bus system 84 includes a power bus, a control bus, and a status signal bus. However, for clear description, various types of buses in the figure are marked as the bus system 84.

The methods disclosed in the foregoing embodiments may be applied to the processor 81, or implemented by the processor 81. The processor 81 may be an integrated circuit chip and has a signal processing capability. In an implementation process, steps of the foregoing methods may be implemented by using an integrated logic circuit of hardware in the processor 81 or an instruction in a form of software. The foregoing processor 81 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor 81 may implement or execute methods, steps and logical block diagrams disclosed in the embodiments. The general purpose processor may be a microprocessor or the processor may be any conventional processor and the like. Steps of the methods disclosed with reference to the embodiments may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 82, and the processor 81 reads information in the memory 82 and completes the steps in the foregoing methods in combination with hardware of the processor 81.

It should be understood that the processor 81 may implement a function of the foregoing acquiring unit 61 in the embodiment corresponding to FIG. 6. The receiver 83 may implement a function of the foregoing receiving unit 62 in the embodiment corresponding to FIG. 6.

Optionally, in an embodiment, the power enhancement information is used to indicate a power enhancement amount of the target field, and the power enhancement amount is determined by the transmit end according to a peak-to-average power ratio PAPR corresponding to the target field and a transmit power amplification limit of the transmit end.

Optionally, in an embodiment, when the target field is a long training field LTF, the receiving, by the receive end 80, the non-legacy field of the preamble according to the power enhancement information includes performing a multi-input multi-output MIMO channel estimation according to the power enhancement amount of the target field that is indicated by the power enhancement information. The receiving may also include receiving subsequent data and a subsequent field according to a result of the MIMO channel estimation. The subsequent field and the subsequent data may include a remaining non-legacy field in the non-legacy field part of the preamble and subsequently transmitted data.

In this embodiment, transmit power enhancement processing is performed on a non-legacy field of a preamble in a wireless local area network WLAN system, which can improve an overall throughput rate of the system, so that data transmission performance and user experience can be enhanced. In addition, a transmit power of a non-legacy field with a relatively low PAPR is improved, which can further significantly enhance system performance. In addition, power enhancement information is added to a non-legacy signal field, so that a peer end can acquire the power enhancement information, and perform a channel estimation according to the power enhancement information; therefore, accuracy of receiving a subsequent field is enhanced.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments. The execution sequences of the processes should be determined according to functions and internal logic of the processes, and should not be construed as any limitation on the implementation processes of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
    performing, by a transmit end, transmit power enhancement processing on one or more target fields of a preamble in a wireless local area network (WLAN) system, wherein the one or more target fields comprises one or more fields, other than a non-legacy signal field, in a non-legacy field of the preamble in the WLAN system, wherein the one or more target fields is selected for transmit power enhancement processing according to a peak-to-average power ratio (PAPR) corresponding to the one or more target fields; and
    sending, by the transmit end, to a receive end the preamble on which transmit power enhancement processing has been performed.

2. The method according to claim 1, wherein the performing, by a transmit end, transmit power enhancement processing on one or more target fields of a preamble in a wireless local area network (WLAN) system further comprises:
    determining a power enhancement amount of the target field according to the PAPR corresponding to the one or more target fields and a transmit power amplification limit of the transmit end; and
    generating a baseband signal of the one or more target fields according to the power enhancement amount of the one or more target fields.

3. The method according to claim 2, wherein the performing, by a transmit end, transmit power enhancement processing on one or more target field of a preamble in a wireless local area network (WLAN) system further comprises:
    adding power enhancement information to a non-legacy signal field of the preamble, wherein the power enhancement information is used to indicate whether power enhancement processing has been performed on the one or more target fields.

4. The method according to claim 3, wherein power enhancement processing has been performed on the one or more target fields, and wherein the power enhancement information is further used to indicate the power enhancement amount of the one or more target fields.

5. The method according to claim 1, wherein the PAPR corresponding to the one or more target fields is less than a threshold, and the threshold is less than a transmit power amplification limit of the transmit end.

6. The method according to claim 1, wherein the one or more target fields comprises a long training field (LTF).

7. A method, comprising:
    acquiring, by a receive end, power enhancement information in a non-legacy signal field of a preamble in a wireless local area network (WLAN) system, wherein the power enhancement information is used to indicate that a transmit end has performed transmit power enhancement processing on one or more target fields of the preamble, and the one or more target fields comprises one or more fields, other than a non-legacy signal field, in a non-legacy field of the preamble in the WLAN system, wherein the power enhancement information is used to indicate a power enhancement amount of the one or more target fields, and the power enhancement amount is determined by the transmit end according to a peak-to-average power ratio (PAPR) corresponding to the one or more target fields and a transmit power amplification limit of the transmit end; and
    receiving, by the receive end, the non-legacy field of the preamble according to the power enhancement information.

8. The method according to claim 7, wherein the one or more target fields is a long training field (LTF), and wherein the receiving, by the receive end, the non-legacy field of the preamble according to the power enhancement information comprises:
    performing a multi-input multi-output (MIMO) channel estimation according to the power enhancement amount of the one or more target fields that is indicated by the power enhancement information; and
    receiving subsequent data and a subsequent field according to a result of the MIMO channel estimation.

9. A data transmission apparatus, comprising:
    a processor configured to perform transmit power enhancement processing on one or more target fields of a preamble in a wireless local area network (WLAN) system, wherein the one or more target fields comprises one or more fields, other than a non-legacy signal field, in a non-legacy field of the preamble in the WLAN system, wherein the one or more target fields is selected for transmit power enhancement processing according to a peak-to-average power ratio (PAPR) corresponding to the one or more target fields; and a transmitter configured to send a receive end the preamble on which transmit power enhancement processing has been performed.

10. The apparatus according to claim 9, wherein the processor is configured to:
   determine a power enhancement amount of the one or more target fields according to the PAPR corresponding to the one or more target fields and a transmit power amplification limit of the apparatus; and
   generate a baseband signal of the one or more target fields according to the power enhancement amount of the one or more target fields.

11. The apparatus according to claim 10, wherein the processor is further configured to add power enhancement information to a non-legacy signal field of the preamble, wherein the power enhancement information is used to indicate whether power enhancement processing has been performed on the one or more target fields.

12. The apparatus according to claim 11, wherein power enhancement processing has been performed on the one or more target fields, and wherein the power enhancement information is further used to indicate the power enhancement amount of the one or more target fields.

13. The apparatus according to claim 9, wherein the PAPR corresponding to the one or more target fields is less than a threshold, and the threshold is less than the transmit power amplification limit of the apparatus.

14. The apparatus according to claim 9, wherein the one or more target fields comprises a long training field (LTF).

15. A data transmission apparatus, comprising:
   a processor configured to acquire power enhancement information in a non-legacy signal field of a preamble in a wireless local area network (WLAN) system, wherein the power enhancement information is used to indicate that a transmit end has performed transmit power enhancement processing on one or more target fields of the preamble, and the one or more target fields comprises one or more fields, except a non-legacy signal field, in a non-legacy field of the preamble in the WLAN system, wherein the power enhancement information is used to indicate a power enhancement amount of the one or more target fields, and the power enhancement amount is determined by the transmit end according to a peak-to-average power ratio (PAPR) corresponding to the one or more target fields and a transmit power amplification limit of the transmit end; and
   a receiver configured to receive the non-legacy field of the preamble according to the power enhancement information.

16. The apparatus according to claim 15, wherein the one or more target fields is a long training field (LTF), and wherein:
   the processor is further configured to perform a multi-input multi-output (MIMO) channel estimation according to the power enhancement amount of the one or more target fields that is indicated by the power enhancement information; and
   the receiver is further configured to receive subsequent data and a subsequent field according to a result of the MIMO channel estimation.

* * * * *